March 5, 1968 R. R. PAGANO Re. 26,360

WEARING APPAREL WITH BODY-CONFORMING INNER PANEL

Original Filed Feb. 19, 1964 2 Sheets-Sheet 1

INVENTOR
RALPH R. PAGANO

BY Eugene J. Kalis

ATTORNEY

WEARING APPAREL WITH BODY-CONFORMING INNER PANEL

Original Filed Feb. 19, 1964

2 Sheets-Sheet 2

INVENTOR.
RALPH R. PAGANO
BY Eugene J. Kalil
ATTORNEY

United States Patent Office

Re. 26,360
Reissued Mar. 5, 1968

26,360
WEARING APPAREL WITH BODY-CONFORMING INNER PANEL

Ralph R. Pagano, 118 87th St.,
Brooklyn, N.Y. 11209

Original No. 3,246,342, dated Apr. 19, 1966, Ser. No. 345,979, Feb. 19, 1964. Application for reissue Dec. 22, 1966, Ser. No. 606,504
4 Claims. (Cl. 128—519)

Matter enclosed in heavy brackets [ ] appears in the original patent but forms no part of this reissue specification; matter printed in italics indicates the additions made by reissue.

*ABSTRACT OF THE DISCLOSURE*

*A wearing apparel is disclosed having a body portion in the region of the waistline to just below the hips comprising a front panel and a rear panel with seams connecting the front and rear panels together along the sides thereof extending from the waistline to below the hips. The front panel has an inner front panel of elasticized material extending across the back thereof, said inner front panel of elasticized material extending from the waistline to just below the hips and being sewn along its sides under transverse tension to the back of the front panel. An inner rear panel of elasticized material extends across the back of the rear panel, the rear panel also extending from the waistline to just below the hips and being sewn while under transverse tension to the back of the rear panel and down along the sides thereof.*

This invention relates to a wearing apparel and, in particular, to an improved apparel construction in the region of the body portion from the waistline to the hips.

Recent trends in the design and construction of wearing apparel, such as skirts and trousers, have been in the direction of emphasizing slender lines. Generally, such constructions have involved the use of the tapering line. In the case of trousers or slacks, whether worn by men or women, this has been achieved by narrowing and tapering the depending leg portions down to the region of the ankles, removing pleats, etc. While such constructions have had a marked effect on current wearing apparel design, little has been done in the way of producing a slender line effect in the body portion of the garment in the region bounded by the waistline and hips without sacrificing comfort. This has been responsible in large measure for discouraging many women from wearing slacks.

It is thus an object of my invention to provide an improved wearing apparel construction having as its purpose to impart a slender appearance to the body in the region of the waistline to the hips.

Another object is to provide a pair of trousers characterized by a construction in the region of the waistline to the hips which not only confers a slender look to the body but also elastically supports and slenderizes portions of the human anatomy such as the abdomen just above the pelvic region and/or the anatomy in the region of the buttocks.

A still further object is to provide a wearing apparel construction characterized in the region of the waistline by a droppable front flap portion which facilitates the dressing and undressing of said apparel.

These and other objects will more clearly appear when considered in the light of the following description and the accompanying drawing, wherein.

It will be appreciated that while the novel construction of my invention is illustrated as applied to trousers, it is advantageously useful for feminine wearing apparel such as skirts, as well as male and female trousers, including knee britches, shorts, jodphurs, slacks and the like.

In accordance with my invention, I provide an improved body construction for wearing apparel having a body portion in the region of the waistline to just below the hips. Broadly speaking, the body portion comprises a front panel and a rear panel connected together via seams along the sides thereof extending from the waistline to below the hips as is commonly employed in the manufacture of trousers. But here the similarity stops in that with regard to the front panel I provide a droppable front flap which commences as part of the waistline inwardly from the sides thereof in the region near the mid-portion and diverges downwardly and outwardly along a line which is connected on each side thereof (somewhat like a trapezoid) to side plackets of the front panel, each side of the droppable front flap terminating outwardly at just below the hips. The advantage of this construction is that the garment, be it a pair of trousers or the like, can be easily slipped on even though it is designed to fit the body very snugly, the downwardly diverging lines of the flap having a tendency of imparting a slender appearance to the body.

In its preferred aspects, an inner front panel of elasticized material or fabric is connected to the inside *or inner face* of the front flap by means of a seam along the waistline and along the connecting sides of the flap, the elasticized material being free transversely along the bottom of the flap. The width of the elasticized material (to be described later) is proportioned to be less than that of the flap so as to provide some tension against the body of the wearer at and above the pelvic region and to add to the slenderizing effect. As a further feature, elasticized material or fabric may be employed as an inner rear panel so as to apply tension across the buttocks of the body in further imparting a slenderizing effect in keeping with the front flap construction.

Figure 1:
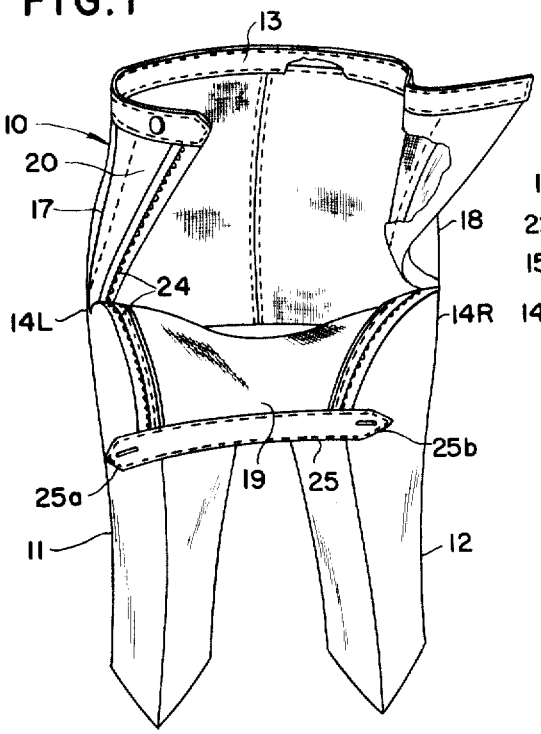
FIG. 1 is a front view perspective of one embodiment of my invention showing the front flap portion at the waistline in the dropped position.
Figure 2:
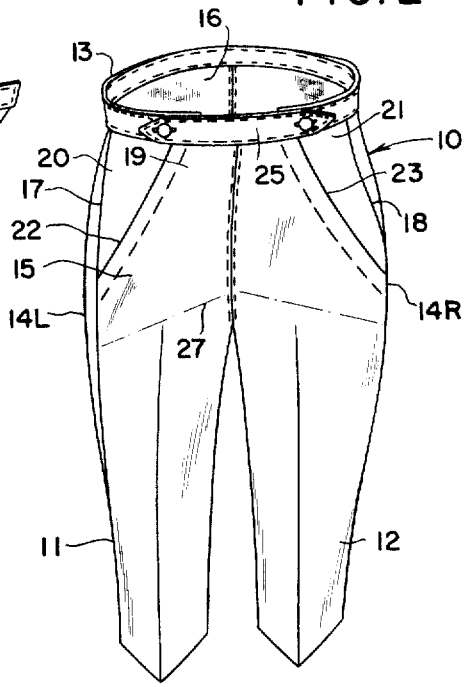
FIG. 2 is like FIG. 1 except the front flap is shown in the secured up position.
Figure 3:
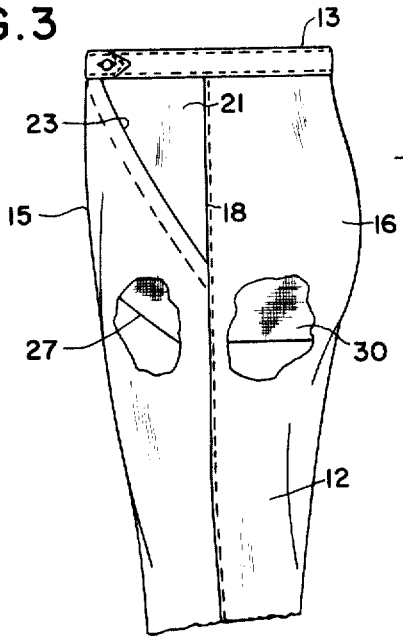
FIG. 3 depicts a side elevation partially broken away of the embodiment shown in FIGS. 1 and 2.

Referring to the various figures of the drawing which depict one embodiment of my invention as applied to a garment shown in this case as a set of trousers, FIGS. 1 and 2 showing a front perspective with the front flap dropped (FIG. 1). As shown in FIG. 2, the body portion is designated generally by the numeral 10 having depending leg portions 11 and 12. The body portion extends from the waistline 13 to just below the hips at about 14L and 14R and comprises a front panel 15 and a rear panel 16 connected together via seams 17 and 18 along the sides of the garment extending from the waistline to below the hips.

The front panel has a droppable flap 19 connected to substantially triangularly shaped side plackets 20 and 21 along lines 22 and 23, for example by means of zippers 24, it being understood that any connecting means may be employed. As will be noted, the upper edge 25 of the flap forms part of the waistline and is connected to the other parts of the waistline by means of connectable wings 25a and 25b located inwardly of the side extremiites of the waist, the sides 22 and 23 of the flap diverging downwardly and outwardly and terminating to just below the hips as at 14L and 14R, respectively. As shown in FIG. 1, the wings are provided with button holes for connection with corresponding buttons on the waistline. As will be observed from FIG. 2, the diverging lines also help to convey a slender appearance to the garment.

Figure 7:
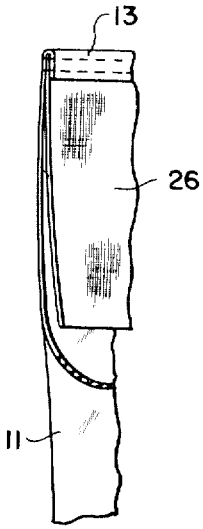
FIG. 7 is a fragmentary longitudinal section of the front side of the trousers taken along line 7—7 of FIG. 5.
Figure 9:
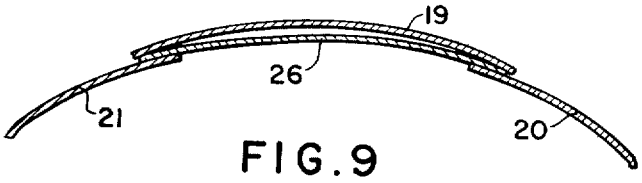
FIG. 9 is an enlarged horizontal section looking from the top taken along line 9—9 of FIG. 5.

As stated hereinabove, it is preferred that the garment have in combination with the body portion, for example with the flap, an inner panel support of elasticized material or fabric. This is shown by the cross hatching in back of the dropped flap in FIG. 1 and in more detail in FIG. 5 which is a rear view of the front panel with the rear panel removed. Here the inner panel support sewed to the back of the front flap is shown as a kind of girdle construction 26 of elasticized material following the substantially trapezoidal contour of the flap and being sewn thereto as shown along the upper edge of the front waistline and down along the diverging sides of the flap, the bottom edge 27 (note also FIG. 2) of the front inner panel support running transversely and freely, that is unconnected, from one side of the front panel to the other, except preferably for an anchoring point 28 slightly below the hip line or approximately two or three inches above the crotch 29. As shown in FIG. 7, which is a longitudinal section taken along line 7—7, the elasticized inner panel or girdle construction 26 hangs slightly apart from the material of the flap, FIG. 7 being exaggerated for purposes of clarily. In sewing the elasticized material along the top and two side edges to the back of the flap, the transverse width of the elasticized material is shorter than that of the flap. This is done by sewing the elasticized material to the back of the flap while it is stretched. This is shown somewhat diagrammatically in the cross section of FIG. 9 taken along line 9—9 of FIG. 5. Note that the width of inner panel 26 is shorter than the width of flap 19 at the region sectioned. When the garment is worn, the inner front panel stretches and accommodates and supports the abdomen above the pelvic region. This helps in further conveying the appearance of a flat slender look.

Figure 5:
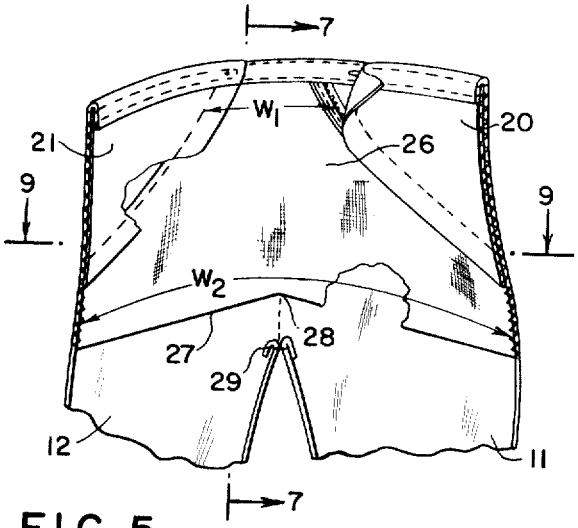
FIG. 5 is a partial perspective looking from the back side of the trousers with the back side removed showing the details of construction of the inside portion of the front panel of the trousers.

In sewing the elasticized material to the back of the front flap, the amount to which the elastic material is stretched before it is sewn in place varies from the top of the flap to the bottom. Referring to FIG. 5, the total width $W_1$ of the elastic material near the top of the flap before it is sewed in place may, for example, be one-quarter less than the width of the flap material, while the width $W_2$ of the elastic material near the bottom of the flap may be one and one-half inches less than that of the flap. Because the width of the flap varies from the top to the bottom, the amount of stretch before sewing is preferably varied accordingly to achieve the desired girdle effect. As a rule of thumb, the transverse stretch may vary one-eight of an inch per inch of flap measured along the sides from the top to the bottom. Thus, assuming a flap length of about twelve inches along the diverging side, the total transverse stretch at the bottom before sewing would be approximately one and one-half inches. Putting it another way, the width of elasticized inner panel at the bottom of the flap should be about one and one-half inches less than that of the flap. Thus, by tranversely stretching the inner panel from the top to the bottom, with the stretch increasing substantially proportionately to a width of the flap, a fairly uniform tension is assured throughout the inner panel.

Figure 4:
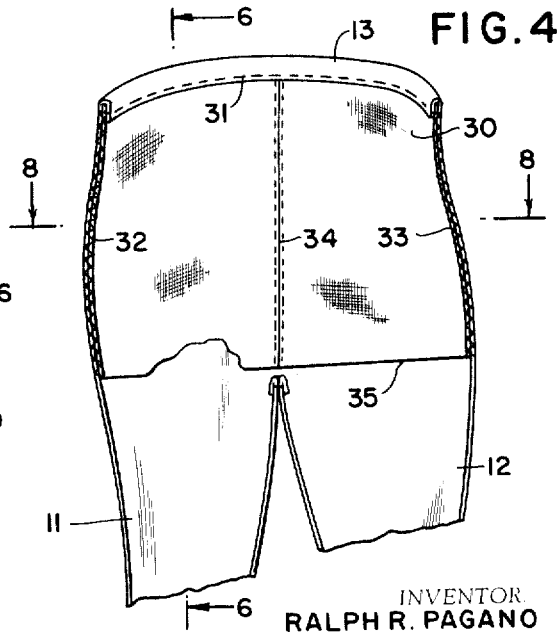
FIG. 4 is a partial front perspective with the front of the trousers removed to show the details of construction in the inside of the back portion of the trousers in the region of the waistline and the buttocks.

With regard to the rear panel, I also prefer that it have an inner panel of elasticized material or fabric sewn to it *at the inner face thereof* in order to support and streamline the body in the general area of the buttock. Referring to FIG. 4, which is a view of the rear inner panel of the rear panel of the garment with the front panel cut away, the elasticized material 30 is indicated in cross hatched lines, the material being sewn along the top of the waist 13 as shown by dotted lines 31 and also vertically along the sides 32 and 33, as well as vertically down the middle of the rear panel at 34. The bottom 35 is similarly unconnected and runs tranversely and freely across the garment just below the hips from one side to the other. In effect, the elasticized inner rear panel may comprise two sections, one bounded by seams 31, 32 and 34 and the other by seams 31, 33 and 34.

Figure 8:
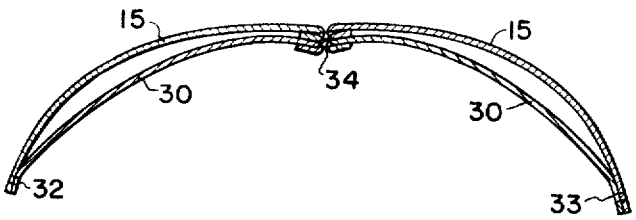
FIG. 8 is an enlarged horizontal section looking from the top taken along line 8—8 of FIG. 4.
Figure 6:
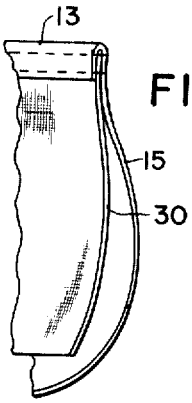
FIG. 6 is a longitudinal section of the back side of the trousers taken along line 6—6 of FIG. 4.

The width of the elasticized rear inner panel in the unstretched condition is less than that of the rear outer panel to which it is sewn in the stretched condition, the amount of stretch of the inner panel as sewn being greater where the width of the outer panel is greater as described for the front inner panel. As a rule of thumb, the width near the waist is about one-quarter inch less than the rear panel and gradually decreases to one and a half inch less at the bottom approximately near the region of the hips. In other words, the rear inner panel will follow the contour of the body. The rear inner panel hangs slightly away from the rear outer panel as shown in FIG. 6 which is a section taken longitudinally along line 6—6 of FIG. 4. However, the space is filled out when the garment is worn. FIG. 8 depicts somewhat diagrammatically a horizontal section taken through line 8—8 of FIG. 4 showing the difference in width between rear inner panel 30 of elasticized material and rear outer panel 15 of the garment, with the two panels joined at seams 32 and 33 at the sides and seam 34 at the middle.

By combining a built-in girdle construction with the novel flap construction provided by the invention in the preferred form shown in the drawing, the slender look is maximized in the region of the waist to the hips. The novel flap construction in the front, particularly where the trousers are snug fitting, allows for ease of dressing and undressing. By employing a front girdle construction as described in combination with the flap, clean lines are assured in the region of the crotch and in the pelvic region without bunching-up of the outer fabric, thus giving the effect of a flat abdomen. Likewise, by employing a back girdle construction as described in combination with the rear panel, clean lines are assured in the region of the buttocks with bunching-up of material greatly minimized.

I find that my novel garment construction is applicable to regular fabrics as well as stretchable fabrics. For example, the outer front and back panels including the whole garment may be made of stretchable fabric. In that case, the elasticized girdle material may have a greater resistance to stretch than the outer panels so as to provide a main support to the body.

Summarizing my invention, I provide a wearing apparel, such as a pair of trousers, comprising a body portion in the region of the waistline to just below the hips wherein I employ an improved body portion construction which comprises a front panel and a rear panel connected together via seams along the side thereof extending from the waistline to below the hips, the front panel being formed of a droppable flap and side plackets, the droppable flap having a connectable waist portion at its upper edge forming part of the waistline. The flap is somewhat trapezoidal in shape and is connectable along each side thereof to a corresponding placket, the sides of the flap connectable to the plackets diverging downwardly and outwardly from the front of the waistline and terminating at the sides of the body portion of the apparel. In the preferred embodiment, the apparel or trousers has an inner front panel of elasticized material combined with the back of the droppable flap, the inner front panel being sewn while under transverse tension to the back of the flap along the waistline and down along the diverging sides to the region of the hips. In addition, the inner panel is further anchored to the front panel at a point above the crotch.

In a more preferred embodiment, the rear panel has combined with it an inner rear panel of elasticized material which is sewn while under transverse tension to the back of the rear panel along the waistline, down along the sides of the body portion of the rear panel and also down the middle of the rear panel from the waistline to the region of the crotch. The elasticized material in both instances is sewn to provide substantially uniform gripping of the body in a kind of girdle construction.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

*1.* In a pair of trousers comprising a body portion in the region of the waistline to just below the hips and having two legs depending therefrom, an improved body portion construction which comprises, a front panel and a rear panel, seams connecting said front and rear panels together along the sides thereof extending from the waistline to below the hips, said front panel being formed of a droppable flap and unconcealed side plackets, each of said unconcealed side plackets comprising a substantially triangularly shaped piece having a substantially vertical edge connected by a seam to and along the sides of the trousers, an edge connected by a seam to the waistline, and an edge diverging downwardly and outwardly at an angle from the waistline and having connecting means therealong for connection to the flap, the droppable flap having a connectable waist portion at its upper edge forming part of the waistline, said flap having connecting means along each side thereof associated with the connecting means of each corresponding placket, the connecting sides of said flap and said unconcealed plackets commencing inwardly from the sides of said trouser in the region near the midportion of the waistline and diverging downwardly and outwardly together from the waistline and terminating at the sides of the body portion of said apparel, an inner front panel of elasticized material combined with the back of said droppable flap, said inner front panel of elasticized material being sewn under transverse tension to the back of said flap along the waist portion, down along the diverging sides and anchored at a point above the crotch, and an inner rear panel of elasticized material combined with the back of said rear panel, said inner rear panel being sewn while under transverse tension to the back of the rear panel along the waistline, down along the sides of the rear panel and down the middle of the rear panel from the waistline to the region of the crotch, said unconcealed triangular plackets being shaped to follow the contour of the body from the midportion of the waistline whereby to effect a clean slim line in cooperation with the flap.

*2. In a wearing apparel comprising a body portion in the region of the waistline to just below the hips, an improved body portion construction which comprises, a front panel and a rear panel, seams connecting said front and rear panels together along the sides thereof extending from the waistline to below the hips, said front panel having an inner front panel of elasticized material extending across the inner face thereof, said inner front panel of elasticized material extending from the waistline to below the hips and being sewn under transverse tension along its sides to the inner face of said front panel and an inner rear panel of elasticized material extending across the inner side of said rear panel, said inner rear panel extending from the waistline to below the hips and being sewn while under transverse tension to the back of the rear panel down along substantially the sides of the rear panel.*

*3. The wearing apparel of claim 2 wherein the inner front panel of elasticized material is anchored to the front panel in the region of the crotch.*

*4. The wearing apparel of claim 3 wherein the inner rear panel of elasticized material is sewn to and substantially down the middle of the rear panel while under transverse tension.*

References Cited

The following references, cited by the Examiner, are of record in the patented file of this patent or the original patent.

UNITED STATES PATENTS

| | | | |
|---|---|---|---|
| 2,387,405 | 10/1945 | Neilson | 2—227 |
| 3,068,871 | 12/1962 | Rapp | 128—519 |
| 3,214,770 | 11/1965 | Smith | 2—227 |
| 3,234,947 | 2/1966 | Bergstein. | |
| 2,283,362 | 5/1942 | Hamilton | 2—237 |
| 2,361,902 | 10/1944 | Sherman | 2—237 |
| 2,593,795 | 4/1952 | Rhoads et al. | 2—235 |

FOREIGN PATENTS

| | | |
|---|---|---|
| 1,102,642 | 5/1955 | France. |

ADELE M. EAGER, *Primary Examiner.*